April 23, 1935.    W. G. HOLLEY    1,998,623
TIRE CHAIN
Filed Oct. 16, 1933
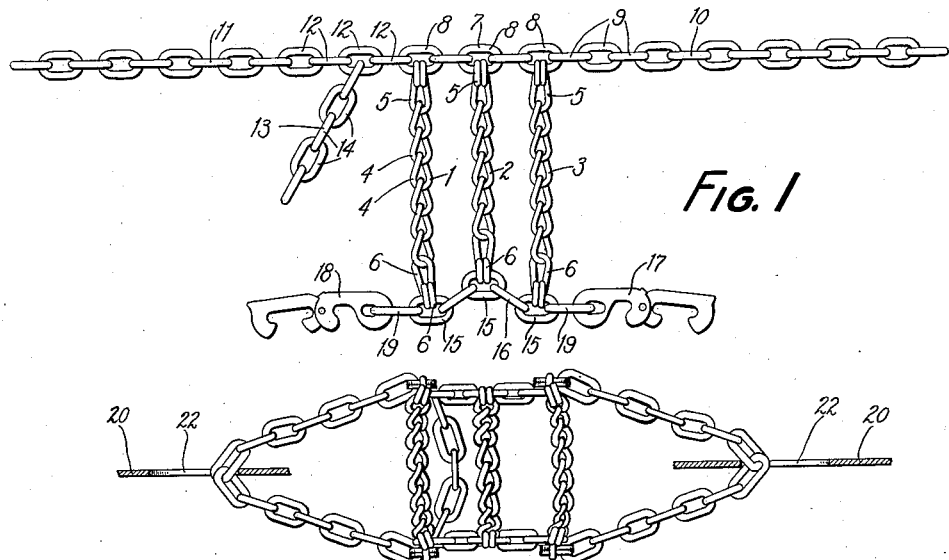
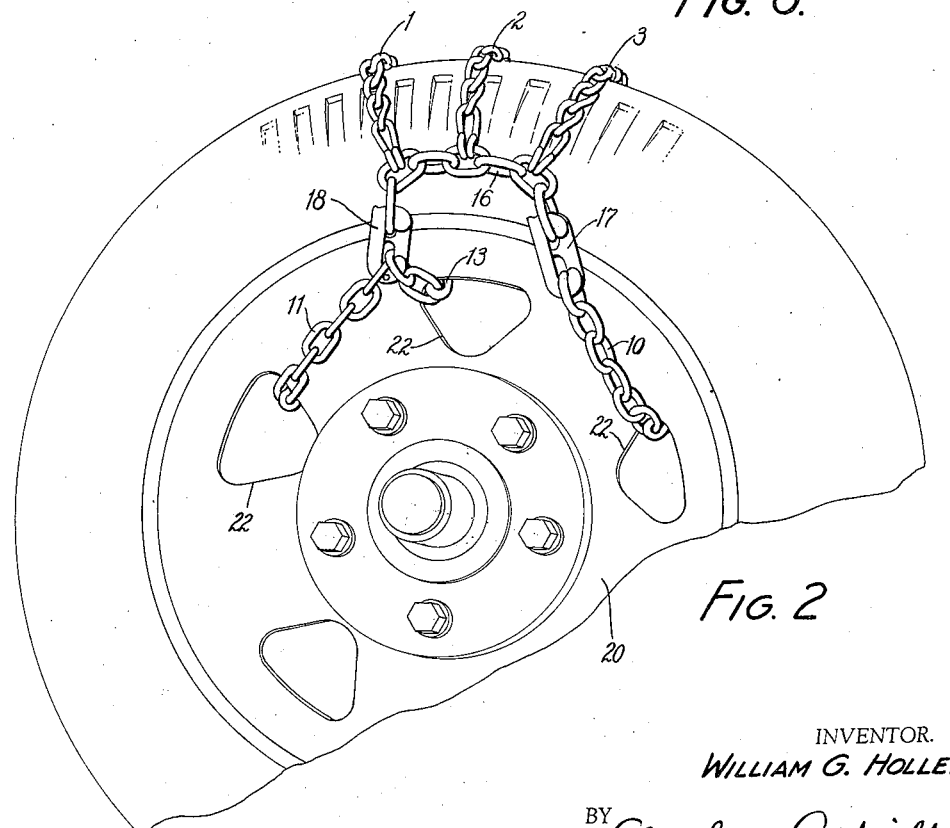
INVENTOR.
WILLIAM G. HOLLEY
BY
ATTORNEYS Patented Apr. 23, 1935

1,998,623

UNITED STATES PATENT OFFICE 1,998,623

TIRE CHAIN

William G. Holley, Cleveland, Ohio, assignor to The Cleveland Chain & Mfg. Company, Cleveland, Ohio, a corporation of Ohio Application October 16, 1933, Serial No. 693,784

10 Claims. (Cl. 152—14)

This invention relates to tire chains for the wheels of vehicles, such for example as automotive vehicles.

While the tire chain of my invention may be employed for general or continuous use in the usual manner, it is particularly applicable to emergency uses; that is to say, upon occasions when added tire traction is needed for a short distance of travel and on occasions when access can be had only to a part of the circumference of the wheel and when it is undesirable or impracticable to jack up the wheel.

It is an object of my invention to provide generally an improved tire chain.

Another object is to provide an improved tire chain unit particularly applicable to emergency uses.

Another object is to provide a tire chain device having improved means for attaching it to a wheel.

Another object is to provide a tire chain unit of the general class providing added traction to only a portion of the circumference of the wheel and which may be applied to the wheel in an improved manner.

Another object is to provide a tire chain unit of the general class referred to having improved means for preventing the applied chain from unduly shifting from its efficient position of use on the wheel.

Another object is to provide a tire chain unit of the general class referred to which may be conveniently and quickly applied to a wheel in an improved manner.

Another object is to provide an improved tire chain of the class referred to which will be simple and cheap to construct and assemble and efficient and durable in operation.

Other objects will be apparent to those skilled in the art to which my invention appertains.

My invention is fully disclosed in the following description taken in connection with the accompanying drawing, in which:

Fig. 1 is a view illustrating a complete chain unit embodying my invention and laid out in a plane with the parts rectilinearly disposed;

Fig. 2 is a side elevational perspective view of the chain unit of Fig. 1 illustrating its application to one type of wheel;

Fig. 3 is a view of the chain of Figs. 1 and 2 illustrating in general the relative disposition of the parts thereof when applied to a wheel, the view being taken generally from the outside of a wheel looking toward the axis and with the wheel parts omitted.

Referring to the drawing, I have shown at 1, 2 and 3, Fig. 1, three cross chains which are to be laid upon the tire tread portions, transversely thereof, as illustrated in Fig. 2. The cross chains may be of any known or suitable construction but preferably comprise twisted intermediate links 4—4 and hook links 5—5—5 on one end and 6—6—6 on the other end of the cross chains.

The hook links 5—5—5 are hooked into alternate links of a side chain 7 comprising, in the particular size chain under consideration, five links 8—8. One end of the side chain 7 is joined to a securing chain having links 9—9, preferably thirteen in number in the size chain under consideration. The other end of the side chain 7 is joined to a securing chain 11 having links 12—12, also preferably thirteen in number.

An anchoring chain 13 is joined to the second link 12 of the securing chain 11 and comprises, in the size chain under consideration, five links 14—14. The hook links 6—6—6 at the other ends of the cross chains 1, 2 and 3 are hooked into alternate links 15—15 of an opposite side chain 16, also preferably of five links in the chain illustrated, and hook devices 17 and 18 are linked to the end links of the side chain 16 by intermediate links 19—19 forming continuations of the side chain 16.

The hook devices 17 and 18 may be of any known or suitable construction but I prefer to employ the hook device illustrated and described in my Patent No. 1,668,528, May 1, 1928, and reference may be had thereto for a complete description of these hook devices.

The manner of applying the chain above described to a wheel will be described in connection with Fig. 2. In this connection, however, it should be stated that the numbers of links in the chain portions 7, 10, 11, 13 and 16 and in the cross chain portions 1, 2 and 3, will be different for different sizes of wheels and tires. The chain of Fig. 1 as above described is, for example, suitable for a wheel having a single pneumatic tire, say, of the 30 x 5 size with the side chain 7 and securing chains 10 and 11 of a total length of 41 inches; and the anchoring chain 13, 8¾ inches long; and the side chain 16, 7¼ inches long.

By suitably increasing the length of the various chain elements constituting the unit chain of Fig. 1, it may be adapted to wheels having single tires of larger size and likewise to dual wheels having two tires. As will appear after a description of Fig. 2, where a single wheel and tire are employed, the unit chain of my invention may be applied, if desired, to both tires of a dual wheel or to the outer of the two tires of a dual wheel.

Referring to Fig. 2, I have shown a unit chain of the construction of Fig. 1 but having chain elements of greater length, the tire and wheel of Fig. 2 being of a larger size than that for which the chain of Fig. 1 is suitable. The wheel is of the disc type comprising a side plate or disc 20 provided with the usual circular series of perforations 22.

In applying the chain unit to the wheel of Fig. 2, the three cross chains 1, 2 and 3 are laid upon the uppermost portion of the tire, as shown in Fig. 2, and with the hook devices 17 and 18 on the outer side of the tire. The operator then reaches through an adjacent perforation 22 and pulls the anchoring chain 13 toward and through the perforation and engages it with the hook device 18. He then reaches through the next counter-clockwisely disposed perforation 22 and pulls therethrough the securing chain 11 and attaches it to the hook device 18, and then operates the hook device to move it from the open position of Fig. 1 to the closed position of Fig. 2 with the outer links of these chains 13 and 11 enclosed within the hook device. If there is an undue amount of slack in these chains, the hook device is put in links more or less remote from the end links.

The securing chain 10 is then pulled through the next clockwisely disposed perforation 22 and all slack in the unit is taken up. The hook device 17 is then hooked into an end link or a link adjacent the end thereof and is operated to the closed position of Fig. 2. It will be observed that the anchoring chain 13 is passed through a perforation intermediate of the perforations through which the chains 10 and 11 are passed.

This completes the installation of the chain unit. The chain elements 10 and 11 may be relied upon to prevent the cross chains 1, 2 and 3 from slipping around the tire circumferentially when the wheel is turned to engage them with the ground, the tendency of the cross chains to move being generally tangential and the securing chain elements 10 and 11 extending in generally tangential or chordal directions.

It will be observed that when the hook devices 17 and 18 are drawn up to pull the chain elements 10 and 11 respectively to take out the slack thereof, an intermediate portion of the chain elements 10 and 11 will be bent at a relatively sharp angle around the edges of the disc perforations 22—22, respectively. The chain elements 10 and 11 are thus given V-formation with the edge of the disc perforation at the apex of the V, and with the chain elements 10 and 11 drawn taut to firmly engage the perforation edge in the apex of the V. This engagement of the chain elements and the perforation edge constitutes in effect a lock, which, due to the tautness of the chain elements 10 and 11, prevents their sliding over the disc edge and thus prevents the side chains 16 and 7 as well as the cross chains 1, 2 and 3 from slipping laterally around the tire.

The cross chains 1, 2 and 3 thus are prevented from movement both circumferentially and laterally from their most efficient functioning position. The tension in the chain elements 10 and 11 which prevents circumferential shifting of the cross chains 1, 2 and 3, also effects the lock above referred to at the V-formation of the chain elements 10 and 11 to prevent lateral shifting.

The anchoring chain 13 is provided as a supplementary locking means, supplementing the chain elements 10 and 11, and to render the chain unit as a whole more universal in application. For example, when the chain unit is used upon an artillery type of wheel, the grip of the V-formation of the securing chain elements 10 and 11 will not be as positive and rigid upon the spoke of an artillery wheel as upon the relatively thin perforation edge illustrated and described in Figs. 2 and 3, although even on artillery wheel spokes, the V-formation which the securing chains naturally take up, will effect a considerable locking effect on the spokes; but in such cases, however, it may suitably be supplemented by the anchoring chain and for this reason it is preferably provided on the unitary chain, rendering the chain units adaptable either to this type wheel or other type wheels such as artillery wheels.

A chain unit of this construction having a plurality such as three cross chains 1, 2 and 3, provides a distinct improvement in its mode of operation over chain units of this general class having only a single chain. A single chain, when the wheel rotates to engage it by the ground, will give only a single impulse of forward movement to the vehicle, and this will carry the single cross chain from contact with the ground by the forward motion of the wheel; and where the vehicle is mired or its wheels are in a hole, the wheels will continue to slip and the single chain will come around again and again and repeatedly engage the ground, tending to make the hole deeper. Where a plurality such as three cross chains is employed, the forward motion impulse given to the vehicle when these chains successively engage the ground is sufficient to carry the vehicle forward onto solid ground, or at least sufficient to keep the vehicle moving.

It will be observed that the installation of the chain unit is performed entirely on the upper portion of the wheel so that it is never necessary to jack the wheel up for this purpose and the installation can be effected even where the lower portion of the wheel is covered with mud or water or is rendered wholly inaccessible by the roughness of the terrain.

While I have shown but a single unit installed on a wheel as in Fig. 2, it will now be apparent that others may successively be installed on the same wheel. In the wheel of Fig. 2, any number of units from one up to five may conveniently be applied, the wheel having five perforations through the disc.

Although the chain unit above described is intended primarily for emergency application only and is intended to be removed after the emergency is over, it is sometimes undesirable or inconvenient to stop the vehicle to remove the chain unit. In such instances, they may be used continuously over any desired length of travel, and where a number of the units are applied on a single wheel, they are extraordinarily efficient in providing traction in soft ground, deep mud or snow and on icy roads. The ability of the unit chain of my invention to be used for continuous running of the vehicle, resides in the V-formation at the engagement of the securing chain elements 10—11 with the wheel and, particularly when artillery type wheels are used, in the employment of the supplemental anchoring chain 13, whereby the cross chains are prevented from unduly shifting sidewise on the tire, and the entire unit is prevented from becoming loose.

To remove the unit chain from the tire, it is only necessary to unhook the hook devices 17 and 18 and remove the chain links therefrom whereupon the entire unit may be lifted from the wheel.

As described above and as plainly illustrated in Fig. 1, the intermediate cross chain 2 is shorter than the cross chains 1 and 3. I have found that this difference in length will cause the three chains to grip the periphery of the tire substantially alike. As shown in Fig. 2, the outer cross chains 1 and 3 tend to dispose themselves diagonally with respect to the intermediate chain 2. Thus a slightly greater length of chain in the outer two cross chains is desirable to have all three cross chains fit alike; and this is provided as above stated by making the central cross chain one link shorter than the outer two cross chains.

My invention is not limited to the exact details of construction illustrated and described. Changes and modifications may be made without departing from the spirit of my invention or sacrificing its advantages, and within the scope of the appended claims.

I claim:

1. In a tire chain unit for wheels of the type comprising a tire and a central body portion having a plurality of angularly spaced openings extending axially therethrough, a pair of side chain elements disposable on opposite sides of the wheel, a plurality of cross chains connecting the side chains and disposable on and over the tire in generally radial directions, a pair of securing chain elements connected respectively to opposite ends of one of the side chain elements, a pair of hook devices connected respectively to opposite ends of the other side chain element, the securing chain elements being adapted to be projected respectively through selected spaced wheel openings and connected to the corresponding hook devices to dispose the securing chain elements in divergent generally chordal loops, the hook devices being of the chain tensioning type and adapted to tension the securing chain elements and side chain elements and cross chains, and an intermediate one of the cross chains being shorter than the outer cross chains whereby the tension exerted in the divergent securing chain elements substantially equally tensions the cross chains.

2. In a tire chain unit for wheels of the type comprising a tire and a central body portion having a plurality of angularly spaced openings extending axially therethrough, a pair of side chain elements disposable on opposite sides of the wheel, three cross chains connecting the side chains and disposable on and over the tire in generally radial directions, a pair of securing chain elements connected respectively to opposite ends of one of the side chain elements, a pair of hook devices connected respectively to opposite ends of the other side chain element, the securing chain elements being adapted to be projected respectively through selected spaced wheel openings and connected to the corresponding hook devices to dispose the securing chain elements in divergent generally chordal loops, the hook devices being of the chain tensioning type and adapted to tension the securing chain elements and side chain elements and cross chains, and the intermediate cross chain being shorter than the two outer cross chains whereby the tension exerted in the divergent securing chain elements substantially equally tensions the three cross chains.

3. In a tire chain unit for wheels of the type comprising a tire and a central body portion having a plurality of angularly spaced openings extending axially therethrough, a pair of side chain elements disposable on opposite sides of the wheel, a plurality of cross chains connecting the side chains and disposable on and over the tire in generally radial directions, a pair of securing chain elements connected respectively to opposite ends of one of the side chain elements, a pair of hook devices connected respectively to opposite ends of the other side chain element, the securing chain elements being adapted to be projected respectively through selected spaced wheel openings and connected to the corresponding hook devices to dispose the securing chain elements in divergent generally chordal V-form loops, the apex of each V lockingly engaging a portion of the wheel at the respective wheel opening by direct contact of the chain links with the wheel portion, and the hook devices being of the chain tensioning type and adapted to tension the securing chain elements and side chain elements and cross chains, and an intermediate cross chain being shorter than the outer cross chains whereby the tension exerted in the divergent securing chain elements substantially equally tensions the cross chains, and the interlocking engagement of the securing chains with the wheel portions preventing shifting of the tensioned cross chains on the wheel tire in the generally axial direction.

4. In a tire chain unit for wheels of the type comprising a tire and a central body portion having a plurality of angularly spaced openings extending axially therethrough, a pair of side chain elements disposable on opposite sides of the wheel, a plurality of cross chains connecting the side chains and disposable on and over the tire in generally radial directions, a pair of securing chain elements connected respectively to opposite ends of one of the side chain elements, attaching means comprising two pairs of mutually interlinkable attaching elements and an element of each pair being on opposite end portions respectively of the securing elements and the other element of each pair being on opposite end portions of the other side chain, the securing elements being adapted to be projected respectively through selected spaced wheel openings whereby the pairs of elements may be interlinked to dispose the securing chain elements in divergent generally chordal loops, the attaching elements having tensioning means associated therewith adapted to tension the securing chain elements and side chain elements and the cross chains, and an intermediate one of the cross chains being shorter than the outer cross chains whereby the tension exerted in the divergent securing chain elements substantially equally tensions the intermediate and outer cross chains.

5. In a tire chain unit for wheels of the type comprising a tire and a central body portion having a plurality of angularly spaced openings extending axially therethrough, a pair of side chain elements disposable on opposite sides of the wheel, three cross chains connecting the side chains and disposable on and over the tire in generally radial directions, a pair of securing chain elements connected respectively to opposite ends of one of the side chain elements, attaching means comprising two pairs of mutually interlinkable attaching elements and an element of each pair being on opposite end portions respectively of the securing elements and the other element of each pair being on opposite end portions of the other side chain, the securing elements being adapted to be projected respectively through selected spaced wheel openings whereby the pairs of elements may be interlinked to dispose the securing chain elements in divergent generally chordal loops, the attaching elements having tensioning means associated therewith adapted to tension the securing chain elements and side chain elements and the cross chains, and the middle cross chain being shorter than the outer cross chains whereby the tension exerted in the divergent securing chain elements substantially equally tensions the cross chains.

6. In a tire chain unit for wheels of the type comprising a tire and a central body portion having a plurality of angularly spaced openings extending axially therethrough, a pair of side chain elements disposable on opposite sides of the wheel, a plurality of cross chains connecting the side chains and disposable on and over the tire in generally radial directions, a pair of securing chain elements connected respectively to opposite ends of one of the side chain elements, attaching means comprising two pairs of mutually interlinkable attaching elements and an element of each pair being on opposite end portions respectively of the securing elements and the other element of each pair being on opposite end portions of the other side chain, the securing elements being adapted to be projected through selected spaced wheel openings whereby the pairs of elements may be interlinked to dispose the securing elements in divergent generally chordal V-form loops, the apex of each V lockingly engaging a portion of the wheel at the respective wheel openings by direct contact of the chain links with the wheel portion, the attaching elements having tensioning means associated therewith to tension the securing chain elements and side chain elements and cross chains, and an intermediate cross chain being shorter than the outer cross chain whereby the tension exerted in the divergent securing chain elements substantially equally tensions the intermediate and outer cross chains, and the interlocking engagement of the securing chains with the wheel portions preventing shifting of the tensioned cross chains of the wheel tire in the generally axial direction.

7. The combination of a tire chain construction and a wheel of the type comprising a tire and a central body portion having a plurality of angularly spaced openings extending axially therethrough, the chain construction comprising a first and a second side chain disposed on opposite sides of the wheel, a plurality of cross chains connecting the side chains and disposed on and over the tire, a pair of chain securing elements connected respectively to opposite ends of the first side chain element, attaching means comprising two pairs of mutually interlinkable attaching elements and an element of each pair being on opposite end portions respectively of the securing elements and the other element of each pair being on opposite end portions of the other side chain, the securing elements being projected through selected spaced wheel openings whereby the pairs of attaching elements are interlinked and the securing elements disposed in divergent chordal loops, an anchoring chain element having an attaching element on an outer end portion thereof and connected by an inner end portion to the chain construction at a point adjacent the juncture of the first side chain and one of the securing elements, and being projected through an intermediate wheel opening and then connected by its attaching element to a chordally disposed portion of the last named securing element, the attaching elements having tensioning means associated therewith tensioning the securing elements longitudinally and tensioning the anchoring element longitudinally and thereby tensioning the said chordally disposed portion by radially deflecting it.

8. The combination of a tire chain construction and a wheel of the type comprising a tire and a central body portion having a plurality of angularly spaced openings extending axially therethrough, the chain construction comprising a pair of side chain elements disposed on opposite sides of the wheel, a plurality of cross chains connecting side chains and disposed on and over the tire, a pair of securing chain elements connected respectively to opposite ends of one of the side chain elements, a pair of hook devices connected respectively to opposite ends of the other side chain element, the securing chain elements being projected respectively through selected spaced wheel openings and connected to the corresponding hook device and disposing the securing chain elements in divergent generally chordal loops, an anchoring chain element connected at one end to the chain construction at a point adjacent the juncture of one of the securing elements and the side chain and being projected through an intermediate wheel opening and connected to a corresponding hook device, the hook devices being of the chain tensioning type and tensioning the securing chain elements longitudinally and tensioning the anchoring element longitudinally and thereby tensioning the said chordally disposed portion by radially deflecting it.

9. A tire chain unit as described in claim 7 and in which three cross chains are employed connected respectively at each end to different links of the side chains and disposed in generally parallel relation.

10. A tire chain unit as described in claim 8 and in which three cross chains are employed connected respectively at each end to different links of the side chains and disposed in generally parallel relation.

WILLIAM G. HOLLEY.